(12) United States Patent
Wai

(10) Patent No.: US 6,481,338 B1
(45) Date of Patent: Nov. 19, 2002

(54) SPOON SHAPED COFFEE BREWING APPARATUS

(75) Inventor: Darrin M. Wai, Tai Po (HK)

(73) Assignee: Electrical and Electronics Limited, Tai Po (HK)

( * ) Notice: Subject to any disclaimer, the term of this patent is extended or adjusted under 35 U.S.C. 154(b) by 0 days.

(21) Appl. No.: 09/943,104

(22) Filed: Aug. 30, 2001

(51) Int. Cl.[7] .................................................. A47J 31/06
(52) U.S. Cl. ........................... 99/302 R; 99/317; 99/323
(58) Field of Search ....................... 99/323, 293, 302 R, 99/295, 318, 319, 317, 323.1, 279, 307

(56) References Cited

U.S. PATENT DOCUMENTS 2,451,195 A * 10/1948 Brown ...................... 99/302 R
3,007,392 A * 11/1961 Pecorado et al. .......... 99/302 R

OTHER PUBLICATIONS

WO 97/43937, Apr. 1997, Illy et al.*

* cited by examiner

Primary Examiner—Reginald L. Alexander
(74) Attorney, Agent, or Firm—Alix, Yale & Ristas, LLP

(57) ABSTRACT

Apparatus for measuring ground coffee, brewing coffee and producing a foam layer on the brewed coffee that includes an elongated handle and a bowl shaped housing fixed to one axial extremity of the handle. The housing has an open top and open bottom. A cover is dimensioned and configured for sealing engagement with the open top. The cover is movable between a position that covers the open top and a second position in which the cover does not cover the open top. A porous mesh is dimensioned and configured for sealing engagement with the open bottom. A plate is dimensioned and configured for sealing engagement with the porous mesh and the plate has an aperture therein dimensioned and configured to control the pressure and velocity of coffee to thereby generate foam on the coffee brewed by the apparatus. A lower housing is dimensioned and configured for sealing engagement with the plate. The lower housing has at least one aperture for directing the flow of brewed coffee to an associated cup. In some forms of the invention the plate includes a plurality of domes. The lower housing may also include a plurality of upstanding tabs.

20 Claims, 6 Drawing Sheets

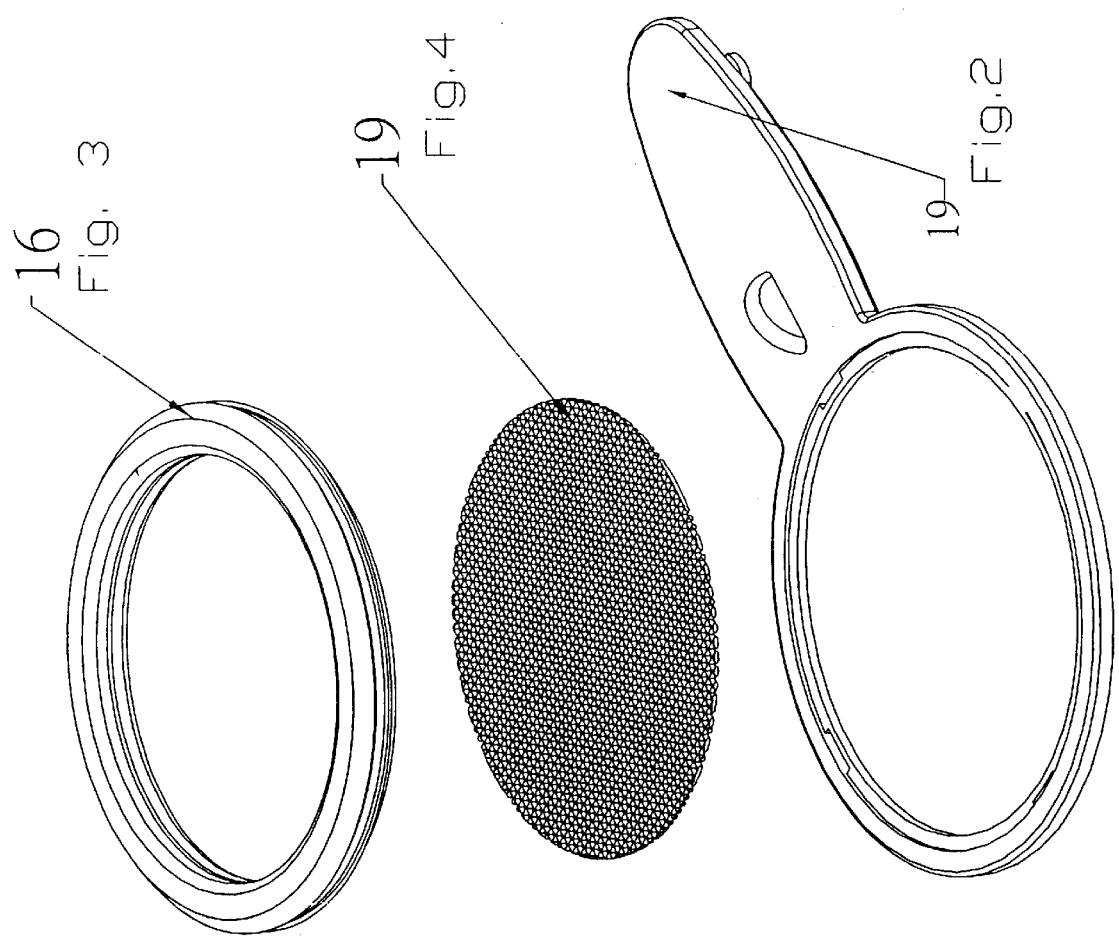

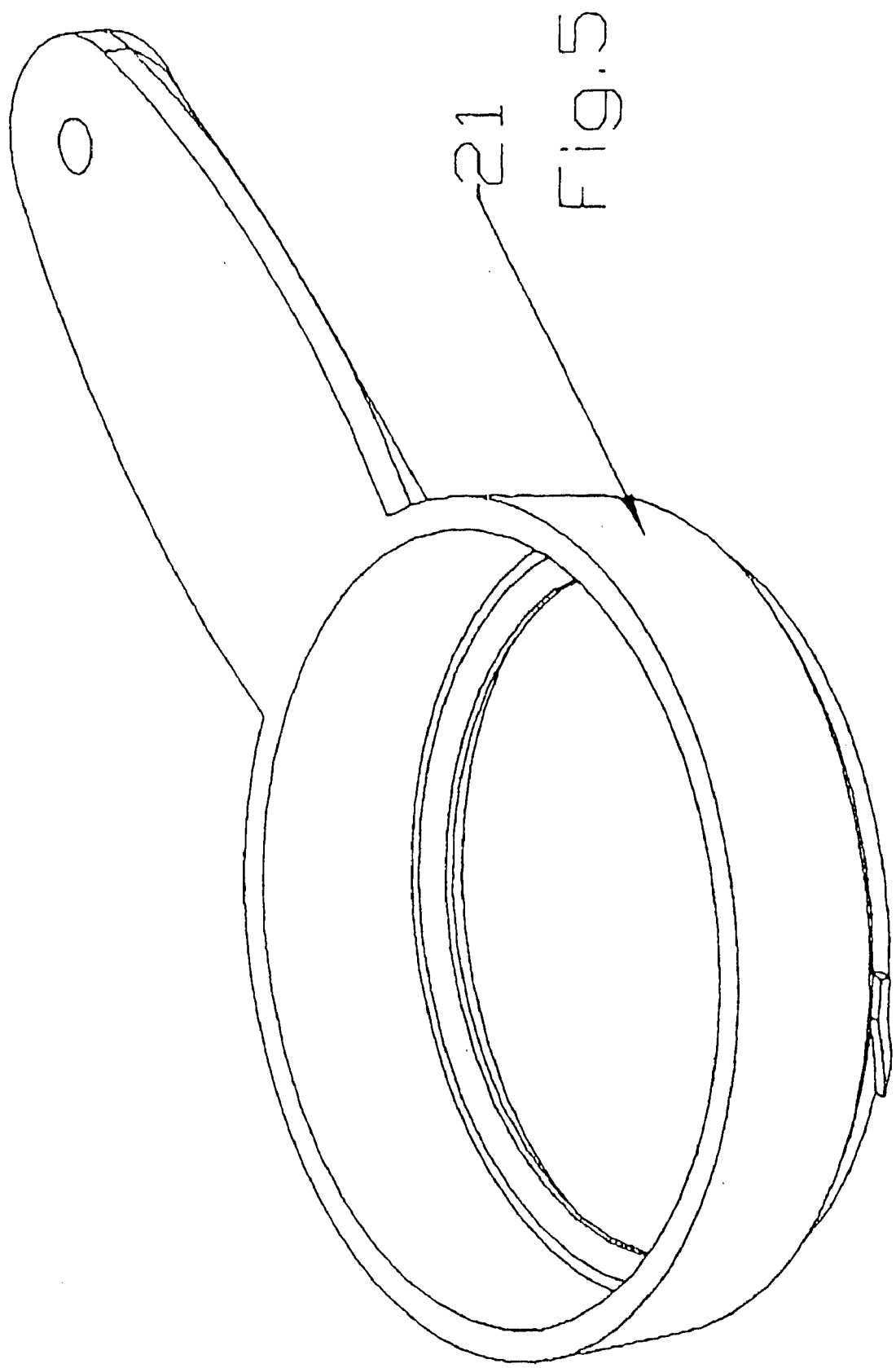

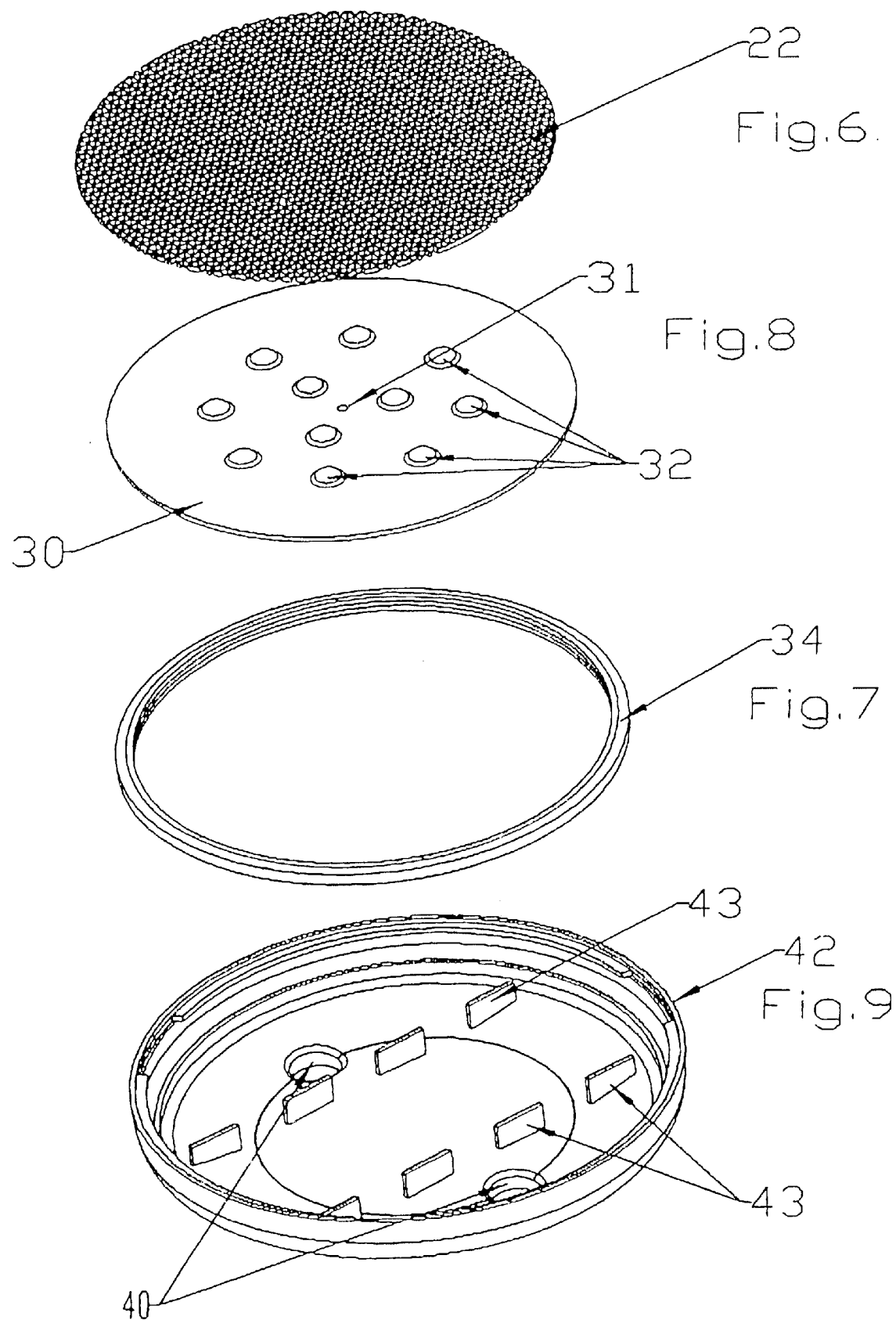

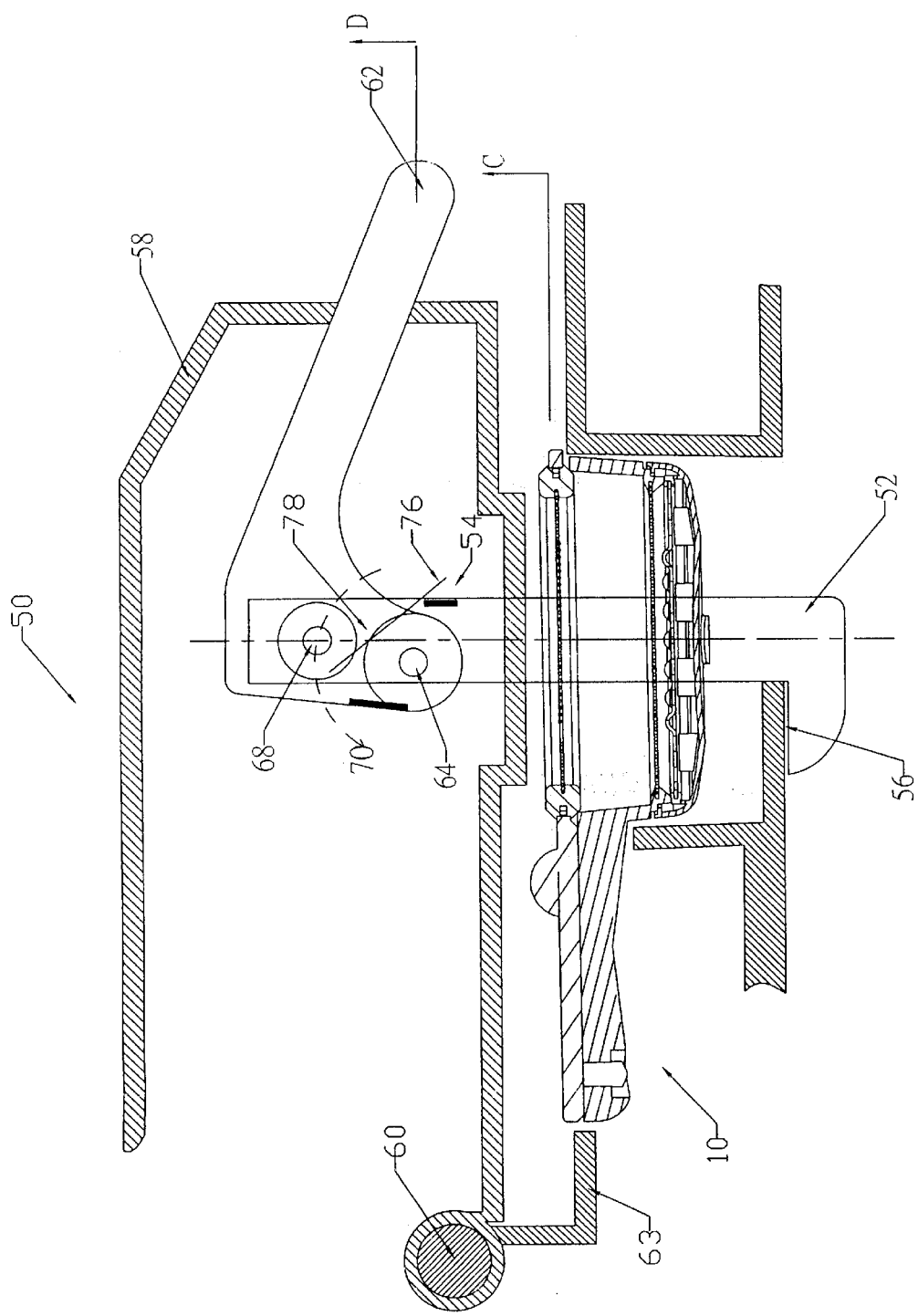

US 6,481,338 B1

SPOON SHAPED COFFEE BREWING APPARATUS

BACKGROUND OF THE INVENTION

This invention relates to apparatus for measuring and brewing an individual portion size quantity of coffee having a small layer of foam and bubbles on the upper surface of the brewed coffee.

Ordinarily, the prior art apparatus for brewing coffee capable of also producing a small foam and bubble layer has required the use of prepackaged coffee pads. Such prepackaged coffee pads are not wholly satisfactory because they are much more expensive than ground coffee purchased in bulk, bags, cans or jars. In addition such prepackaged coffee pads are not as readily available in many marketing channels as coffee purchased in bulk, bags, cans or jars.

The prior art includes a wide variety of drip coffeemakers, percolators, vacuum coffeemakers and espresso makers. The present apparatus may include or cooperate with a discrete steam/hot water generating apparatus. More generally, the present apparatus is intended to be locked in sealed fluid engagement with the steam or hot water making machine and retained in the machine with an inlet thereof in communication with the machine outlet during the coffee brewing procedure.

SUMMARY OF THE INVENTION

An object of the invention is to provide new and improved apparatus that will brew an individual portion of coffee for a user and which is constructed in a manner that allows multiple users each having their own spoon shaped coffee brewing apparatus sequentially in a coffee making machine to brew their respective portions of coffee.

A further object of the present invention is to provide new and improved apparatus that will facilitate both the measuring of the desired quantity of ground coffee required to brew an individual portion as well as the actual brewing process.

Still another object of the invention is to provide brewing apparatus that reduces the time and effort required to clean the apparatus.

Yet another object of the invention is to eliminate the necessity for providing the spoon to measure coffee and the necessity for cleaning such a spoon.

A further object of the invention is to provide brewing apparatus that does not require prepackaged coffee pads and thus avoids the expense of such pads as well as the inconvenience involved in procuring such pads.

It has now been found that these and other objects of the invention may be attained in apparatus for measuring ground coffee, brewing coffee and producing a foam layer on the brewed coffee that includes an elongated handle and a bowl shaped housing fixed to one axial extremity of the handle. The housing has an open top and an open bottom. A cover is dimensioned and configured for sealing engagement with the open top. The cover is movable between a position that covers the open top and a second position in which the cover does not cover the open top. A porous mesh is dimensioned and configured for sealing engagement with the open bottom. A plate is dimensioned and configured for sealing engagement with the porous mesh and the plate has an aperture therein dimensioned and configured to control the pressure and velocity of coffee to thereby generate a foam on the coffee brewed by the apparatus. A lower housing is dimensioned and configured for sealing engagement with the plate. The lower housing has at least one aperture for directing the flow of brewed coffee to an associated cup.

In some forms of the invention the plate includes a plurality of domes. The lower housing may include a plurality of upstanding tabs. Some embodiments of the invention may include a plurality of upstanding tabs disposed in a first plane and another plurality of upstanding tabs disposed in a second plane. The first and second planes may be parallel and laterally spaced. The cover is supported by a hinge in some embodiments and the hinge may have an axis that is substantially perpendicular to the elongated handle.

In some forms of the invention the cover includes a porous mesh and a peripheral seal dimensioned and configured for cooperation with apparatus for producing hot liquid water and steam.

The porous mesh and the peripheral seal may be insert molded together and the brewing apparatus may further include apparatus for generating hot water and steam that is dimensioned and configured for sealing engagement with the cover and a clamp structure that applies a clamping force to the lower housing and to the cover. The clamp structure may include a J-shaped hook and a pivotally mounted elongated latch handle cooperating with the J-shaped hook. In some cases the elongated latch handle and the J-shaped hook are pivotally connected and the elongated latch handle is pivotally connected to a housing.

BRIEF DESCRIPTION OF THE DRAWINGS

The apparatus in accordance with present invention will be better understood by reference to the accompanying drawing in which:

FIG. 2 is a perspective view of the spoon top cover portion of the spoon brewer assembly.

FIG. 3 is a perspective view of the brew seal that cooperates with the spoon top cover portion and which engages the associated drip coffee machine.

FIG. 4 is a perspective view of the brew mesh that cooperates with the brew seal and through which water from the associated drip coffee making machine passes into the spoon brewer assembly.

FIG. 5 is a perspective view, partly in phantom, of the spoon body on which the spoon top cover, brew seal and brew mesh are mounted and which receives ground coffee as part of the coffee brewing process.

FIG. 6 is a perspective view of the coffee mesh secured to the lower axial extremity of the spoon body and which ensures that no part of the ground coffee passes into the brewed coffee.

FIG. 7 is a perspective view of the seal that is disposed between the foam plate and spoon cap.

FIG. 8 is a perspective view of the foam plate.

FIG. 9 is a perspective view, partly in phantom, of the spoon cap.

FIG. 11 is a side elevation view of the spoon brewer assembly together with a schematically represented clamp mechanism provided to clamp elements of the spoon brewer assembly with forces applied substantially vertically to secure the respective parts thereof together when steam or very hot water is forced into the open upper face of the spoon brewer assembly.

DESCRIPTION OF THE PREFERRED EMBODIMENTS

Figure 1:
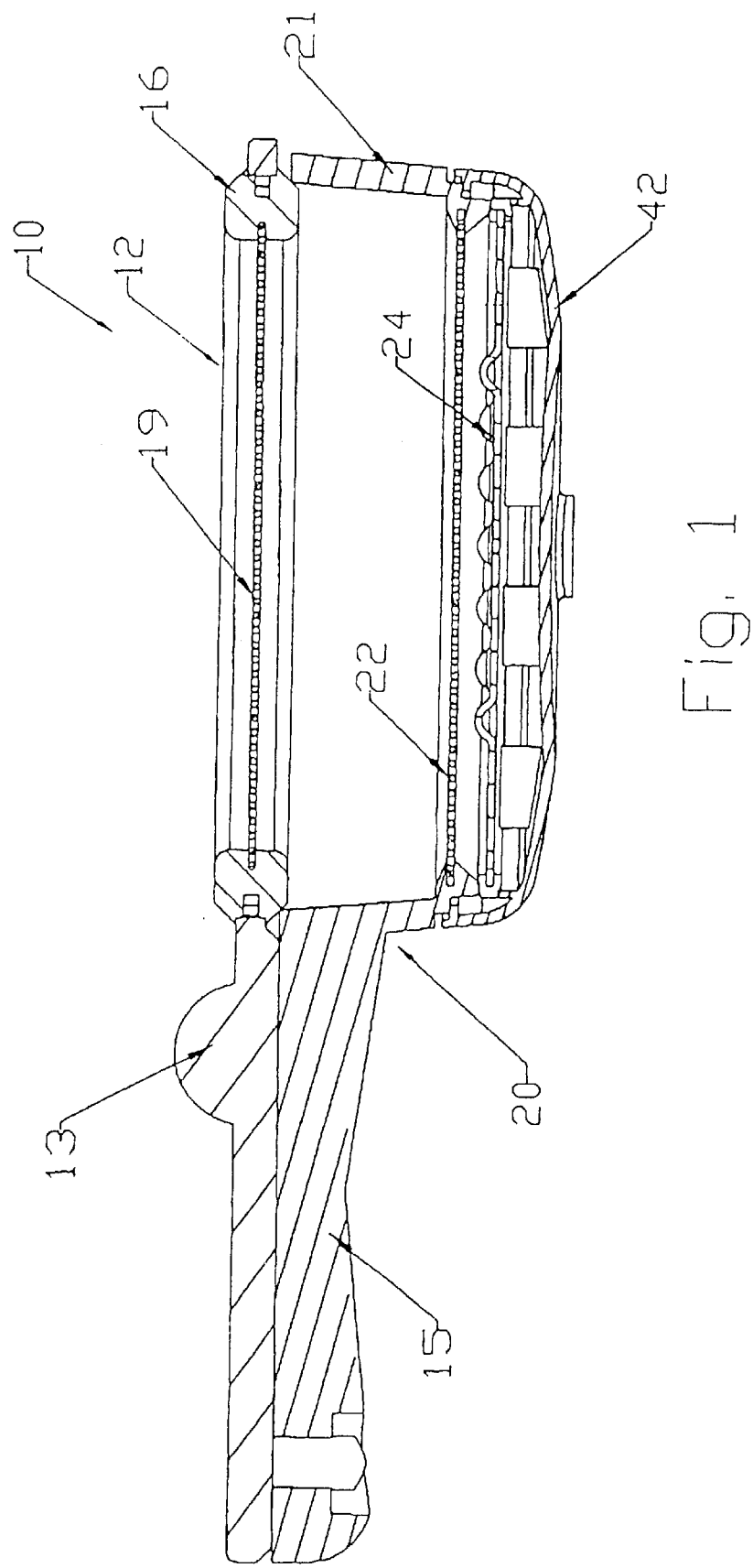
FIG. 1 is a cross-sectional view, partly in phantom, taken along a vertical plane that bisects the spoon brewer assembly.
Figure 10:
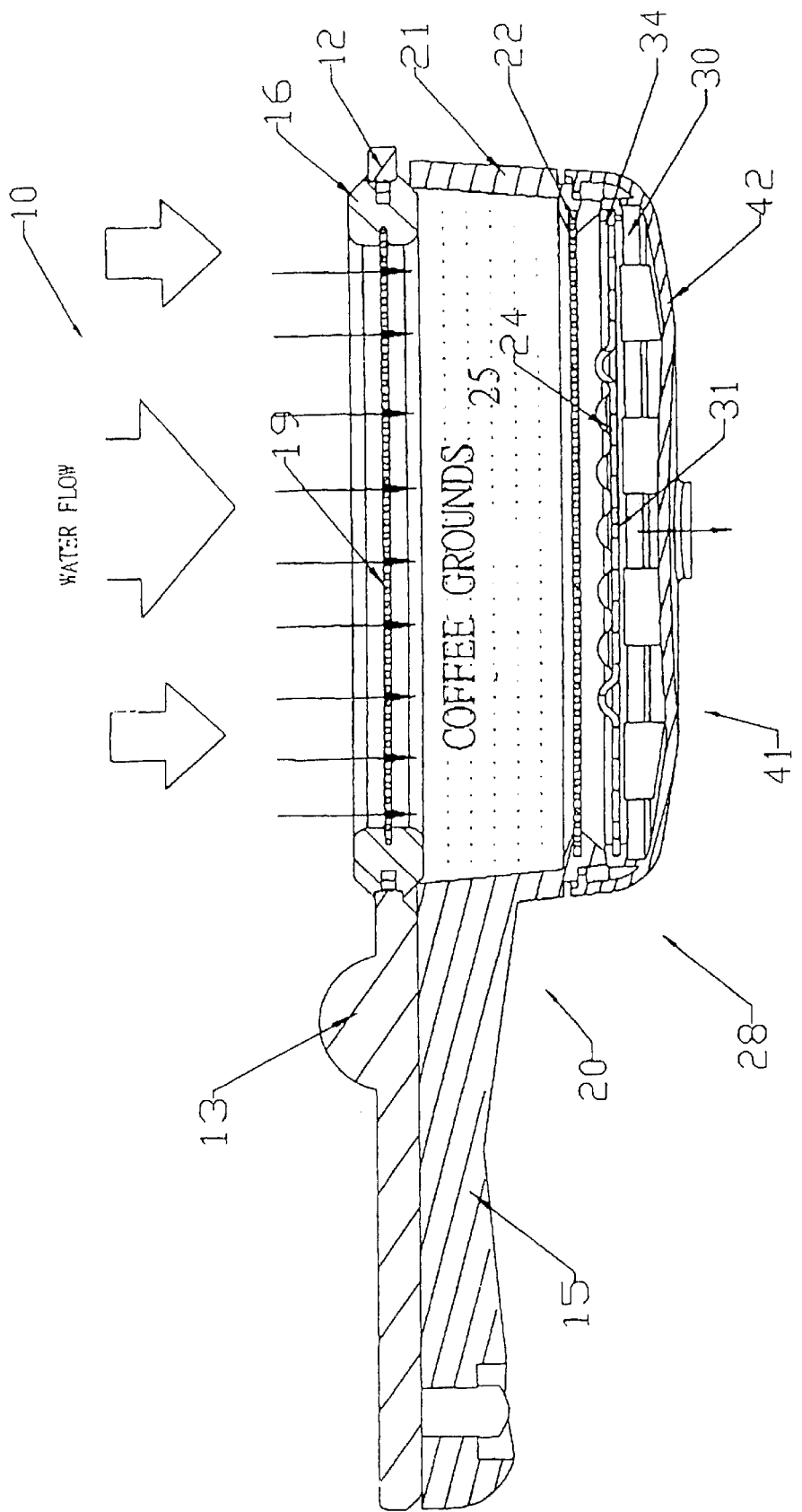
FIG. 10 is an enlarged fragmentary cross-sectional view, partly in schematic and partly in phantom, view of the spoon brewer assembly illustrating the respective parts thereof in more detail.

Referring now to FIGS. 1–11 there is shown a spoon brewer assembly 10 in accordance with one form of the present invention. The spoon brewer assembly 10 is intended for use with a rapid brewing single serve machine capable of producing either steam or very hot water and to force that steam or very hot water into the inlet of the spoon brewer assembly. The user of the spoon brewer assembly 10 may use the apparatus to measure the required quantity of ground coffee required for a cup or portion of coffee and then use the apparatus to brew the coffee. (Reference herein to a cup of coffee should not be taken literally. Although, some cups of coffee may literally be 237 milliliters it will be understood that the typical portion is larger.) The use of the apparatus of the present invention eliminates the need to provide a spoon to measure the coffee and also eliminates the need to clean such a spoon.

Ordinarily, the rapid brewing single serve machine will be capable of brewing sequential serving portions in a plurality of spoon brewer assemblies that are sequentially positioned in sealed engagement with the rapid brewing single serve machine. More particularly, the sequential brewing of such portions will ordinarily be accomplished at a rate such that the total volume of the coffee brewing in a given time interval will be at least as great as the volume of coffee brewed in the same time interval by much larger conventional drip coffee making apparatus.

The spoon brewer assembly 10 comprises four subassemblies. They are the spoon top cover assembly 12, the spoon body assembly 20, the foam plate assembly 28 and a spoon cap assembly 41.

The spoon top cover assembly 12 comprises a spoon top cover 14, a brew seal 16 and a brew mesh 19. These three parts may be insert molded together or assembled together after molding. The spoon top cover 14 is mounted with a hinge 13 that has an axis that is perpendicular to the axis of an elongated handle 15.

The spoon body assembly 20 is made up a spoon body 21 and a coffee mesh 22 that are insert molded together and thus not separable after the molding step. The spoon body 21 is a generally cylindrical section shaped or bowl shaped body 21 having an open top and an open bottom. The coffee mesh 22 is ordinarily manufactured of either a nylon mesh or a stainless steel mesh although other materials approved for contact with food products and which are suitable for use at the temperatures required may be used. In the operation of the spoon brewer assembly 10, the user will utilize the apparatus to scoop ground coffee 23 from a container. Alternatively, the user may pour ground coffee into the assembly 10 and utilize indicia (not shown) on the assembly 10 to establish the correct quantity of ground coffee. The ground coffee 23 remains disposed within the spoon body 21 during the brewing processes.

The lower extremity of the spoon body 21 is disposed in sealed relationship to a foam plate assembly 28. The term "foam plate" as used herein refers to a stainless steel plate for generating a foam on the surface of the coffee brewed with the apparatus as opposed to the composition of the plate. The foam plate assembly 28 is made up of a foam plate 30 and a foam plate seal 34. The plate 30 and the seal 34 may be insert molded together or assembled from the individual components. The foam plate 30 has a small hole 31 at the geometric center thereof to direct the extracted coffee stream. The stream of extracted coffee is directed in a manner to cause mixing with a surrounding air to make at least part of the extracted coffee stream include foam. The foam plate 30 is provided with a plurality of domes 32 that ensure that the flow of coffee extracted and passing through the coffee mesh 22 and the foam plate 30 is not obstructed. The hole 31 is dimensioned and configured to control the velocity, pressure and timing of the coffee extraction.

Disposed in sealing engagement with the lower face of the foam plate 30 is a lower housing 42 that directs the flow of brewed coffee to dual outlet ports 40. The lower housing 42 is generally dish shaped. Two discreet ports 40 are provided in some embodiments of the invention to allow simultaneous filing of two coffee cups, mugs or carafes (not shown). Upstanding planar tabs 43 are arrayed in substantially two parallel laterally spaced planes on the upper face of the lower housing. The tabs 43 are provided to ensure substantially equal flow out of the two apertures 40.

Referring now to FIG. 11, there is shown the spoon brewer assembly 10 in combination with a coffee making machine 50. The coffee making machine 50 includes a substantially J-shaped hook 52 having a generally vertical elongated stem portion 54 and a generally horizontal step portion 56. The coffee making machine 50 also includes a top frame 58 coupled by a hinge 60 to a lower frame 63. The spoon brewer assembly 10 is placed intermediate the top frame 58 and the lower frame 63 after the top frame 58 is pivoted away from the lower frame 63. Thereafter, the top frame 58 is pivoted in a clockwise direction about the axis of the hinge 60. The step portion 56 engages a generally horizontal lower face of the lower frame 63 in the manner illustrated in FIG. 11. A latch handle 62 cooperates with the J-shaped hook 52 and the top frame 58 to lock the respective elements of the apparatus together during the coffee brewing or extracting step. FIG. 11 illustrates the respective positions of the elements when the spoon brewer assembly 10 is locked intermediate the top frame 58 and the lower frame 63.

The spoon brewer assembly 10 is released from top frame 58 when the latch handle 62 is pivoted counterclockwise about the axis 64. A pin having an axis 64 engages the top frame 58 and the latch handle 62 and allows relative rotational movement. Thus, all rotational movement of the latch handle 62 is about the axis 64 that is fixed with respect to the top frame 58. A second pin having an axis 68 couples the latch handle 62 and the J-shaped hook 52 in a manner that allows relative rotational movement therebetween. The mechanism includes a spring 78. Counterclockwise movement of the latch handle 62 about the axis 64 causes movement of the axis 68 in an arcuate path 70 that results in the step portion 56 disengaging from the lower frame 63. Continued counterclockwise movement of the latch handle 62 results in a surface 74 on the latch handle 62 impacting a surface 76 on the J-shaped hook 52. Accordingly, the J-shaped hook 52 moves from the position shown in FIG. 11 to a position to the right of the illustrated position. Thus, the top frame 58 may then be rotated counterclockwise about the axis of the hinge 60.

The coffee making machine 50 engages the spoon top cover 14 with a sealed engagement whereby high pressure liquid water and/or steam is forced through the coffee mesh 19, the coffee grounds 23, the brew mesh 22 and the aperture 31 of the plate 30.

The invention provides an apparatus that is easy to clean and which minimizes the necessity for cleaning. The necessity for cleaning is minimized in part because the spoon brewer assembly 10 is intended to prepare a portion of coffee for a single person: Ordinarily, the cleaning requirement for coffee apparatus is dictated by the use of the apparatus being used by more than one person and the consequent necessity for prevention of germ transfer from one person to another. The need for cleaning such apparatus is also often dictated by the apparatus being used for different types of coffee in sequential brewing operations and the necessity to prevent contamination of the taste of any given coffee being brewed by the residue from a prior brewing operation. Thus, by having apparatus intended to be used ordinarily by a single person there is a substantially reduced danger of transfer germs from one person to another and there is a substantially reduced danger of contamination of one batch of coffee by a prior batch of coffee since a single user will frequently have any preference for a specific kind of coffee and will repetitively use the same coffee.

Although, the present invention has primary application for use in measuring and brewing coffee, it will be understood by those skilled in the art that the apparatus may also be used for other beverages. While the preferred embodiment of the present invention has been shown and described, various modifications and substitutions may be made thereto without departing from the spirit and scope of the invention. Accordingly, it is to be understood that the present invention has been described by way of illustration and not limitation.

What is claimed:

1. Apparatus for measuring ground coffee, brewing coffee and producing a foam layer on the brewed coffee, which comprises:
    an elongated handle;
    a bowl shaped housing fixed to one axial extremity of said handle, said housing having an open top and an open bottom;
    a cover dimensioned and configured for sealing engagement with said open top, said cover being movable between a position that covers said open top and a second position in which said cover does not cover said open top;
    a porous mesh dimensioned and configured for sealing engagement with said open bottom;
    a plate dimensioned and configured for sealing engagement with said porous mesh, said plate having an aperture therein dimensioned and configured to control the pressure and velocity of coffee to thereby generate a foam on the coffee brewed by the apparatus; and
    a lower housing dimensioned and configured for sealing engagement with said plate, said lower housing having at least one aperture for directing flow of brewed coffee to an associated cup.

2. The apparatus in accordance with claim 1, wherein said plate includes a plurality of domes.

3. The apparatus in accordance with claim 1, wherein said lower housing includes a plurality of upstanding tabs.

4. The apparatus in accordance with claim 3, wherein a plurality of upstanding tabs is disposed in a first plane and another plurality of upstanding tabs is disposed in a second plane.

5. The apparatus in accordance with claim 1, wherein said first and second planes are parallel and laterally spaced.

6. The apparatus in accordance with claim 1, wherein said cover is supported by a hinge.

7. The apparatus in accordance with claim 6, wherein said hinge has an axis that is substantially perpendicular to said elongated handle.

8. The apparatus in accordance with claim 1, wherein said cover includes a porous mesh and a peripheral seal dimensioned and configured for cooperation with apparatus for producing hot liquid water and steam.

9. The apparatus in accordance with claim 8, wherein said porous mesh and said peripheral seal are insert molded together.

10. The apparatus in accordance with claim 1 further including apparatus for generating hot water and steam that is dimensioned and configured for sealing engagement with said cover.

11. The apparatus in accordance with claim 10 further including a clamp structure that applies a clamping force to said lower housing and to said cover.

12. The apparatus in accordance with claim 11, wherein said clamp structure includes a J-shaped hook.

13. The apparatus in accordance with claim 12, wherein said clamp structure further includes a pivotally mounted elongated latch handle cooperating with said J-shaped hook.

14. The apparatus in accordance with claim 13, wherein said elongated latch handle and said J-shaped hook are pivotally connected.

15. The apparatus in accordance with claim 14, wherein said elongated latch handle is pivotally connected to a housing.

16. The apparatus in accordance with claim 15, wherein said plate includes a plurality of domes.

17. The apparatus in accordance with claim 16, wherein said lower housing includes a plurality of upstanding tabs.

18. The apparatus in accordance with claim 17, wherein a plurality of upstanding tabs is disposed in a first plane and another plurality of upstanding tabs is disposed in a second plane.

19. The apparatus in accordance with claim 18, wherein said first and second planes are parallel and laterally spaced.

20. The apparatus in accordance with claim 19, wherein said cover is supported by a hinge.

\* \* \* \* \*